Figure 1:
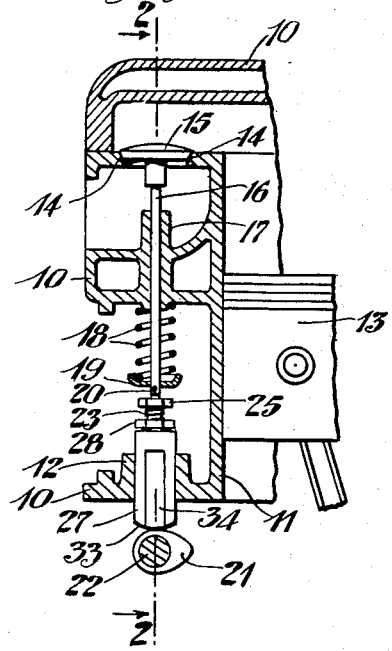

Nov. 11, 1930.  W. E. HOKE  1,781,011
VALVE MECHANISM
Filed April 16, 1929   2 Sheets-Sheet 1

INVENTOR
William E. Hoke
BY
ATTORNEYS

Nov. 11, 1930.    W. E. HOKE    1,781,011
VALVE MECHANISM
Filed April 16, 1929    2 Sheets-Sheet 2
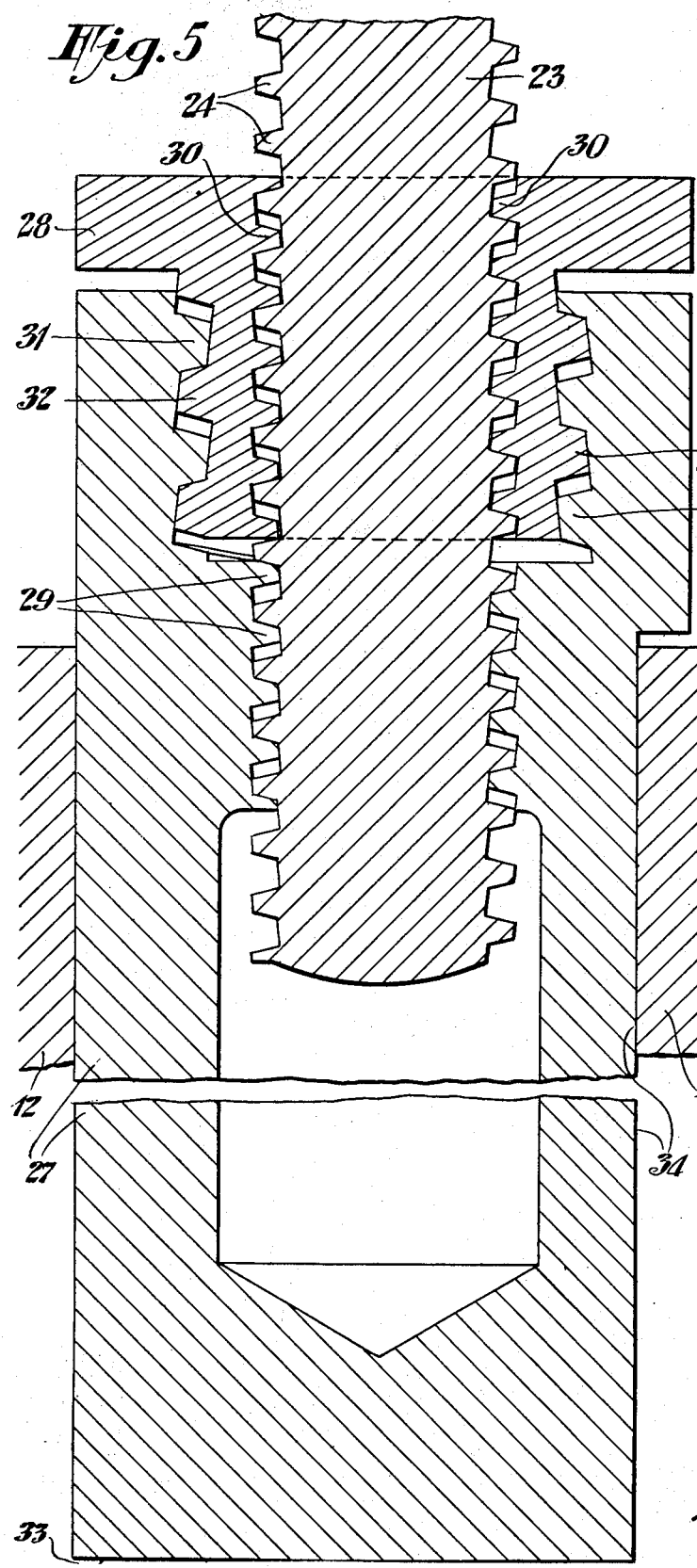
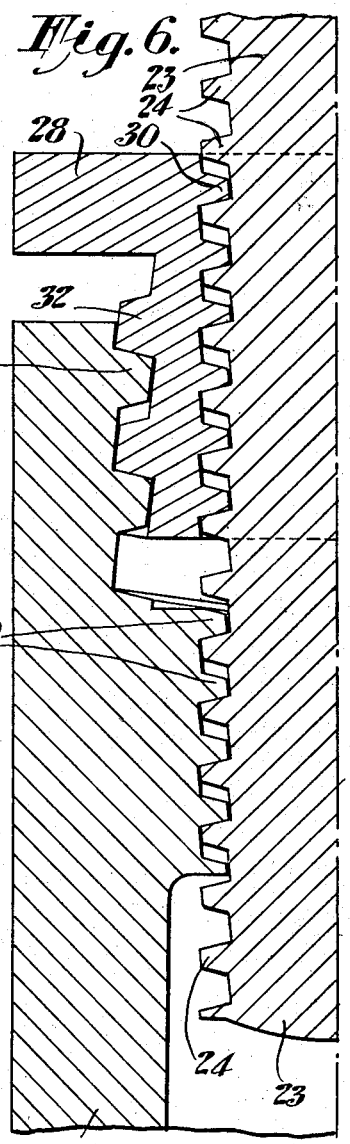
INVENTOR
William E. Hoke
BY
ATTORNEYS Patented Nov. 11, 1930

1,781,011

UNITED STATES PATENT OFFICE

WILLIAM E. HOKE, OF BALTIMORE, MARYLAND, ASSIGNOR TO DARDELET THREAD-LOCK CORPORATION, OF NEW YORK, N. Y., A CORPORATION OF DELAWARE

VALVE MECHANISM

Application filed April 16, 1929. Serial No. 355,571.

This invention relates to improvements in valve mechanism.

One object of the invention is to provide an efficient valve mechanism. Another object of the invention is to provide a poppet valve actuating means, especially adapted for use in internal combustion engines, which may be properly adjusted with ease and dispatch and will securely hold the desired adjustment. A further object of the invention is to provide an efficient adjustable tappet device for actuating valves and other movable devices and machine elements by impacts. Another object of the invention is to provide a tappet mechanism wherein one vibrating member is extensible and contractible and consists of parts screw thread connected for extension and contraction of the member and for securely locking the parts of the member in adjusted relation against accidental relative adjusting screw movement and against direct axial movement therebetween through the medium of the threads of the screw connection.

Other objects and advantages of the invention will appear from the following description of the embodiments of the invention illustrated in the accompanying drawings. While the invention is shown in connection with poppet valve mechanism for internal combustion engines it will be understood that it is applicable to tappet mechanism generally, and that the invention is not limited to employing threads of the particular profile illustrated or the particular types of tappet mechanism illustrated, the scope of the invention being pointed out in the appended claims.

Figure 2:
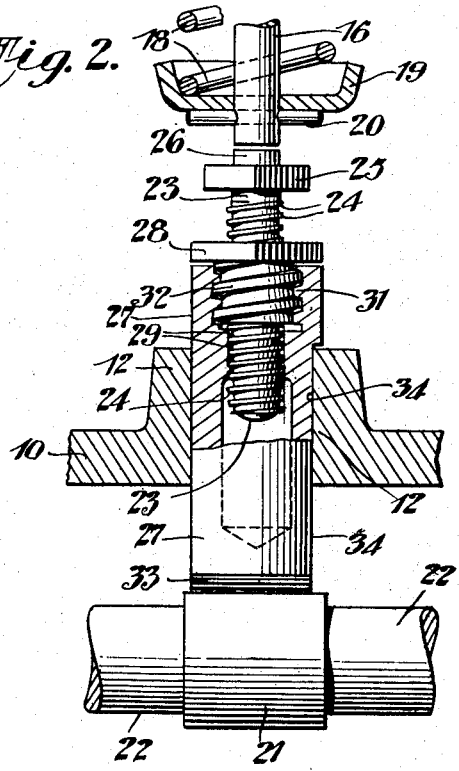
Figure 3:
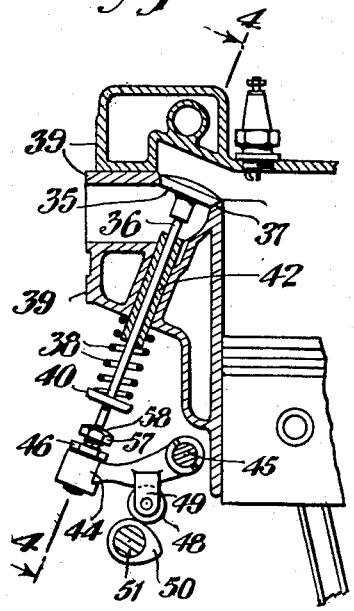
Figure 4:
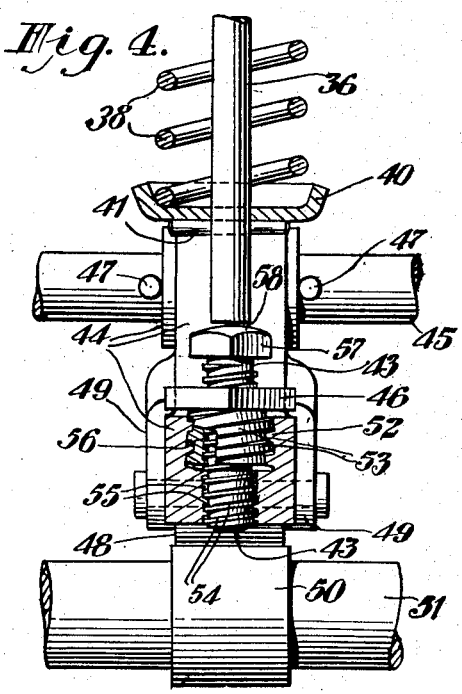

In the drawings:

Fig. 1 is a fragmentary vertical sectional view of an internal combustion engine showing one embodiment of the invention;

Fig. 2 a section on the line 2—2 of Fig. 1;

Fig. 3 a fragmentary vertical sectional view of an internal combustion engine showing another embodiment of the invention;

Fig. 4 a section on the line 4—4 of Fig. 3;

Fig. 5 a fragmentary sectional view on the same line as Fig. 2 showing the parts of the adjustable member in adjusted and locked relation thereof illustrated in Figs. 1 and 2; and Fig. 6 a fragmentary sectional view on the same line as Fig. 5 showing the parts of the adjustable member in unlocked relation for free screwing adjustment of the adjustable member.

In the construction shown in Figs. 1, 2, 5 and 6, 10 designates the engine casting, 11 one of the engine cylinders, 13 the piston in said cylinder, 14 the seat for the inlet valve, and 15 the inlet valve fixed on the upper end of the valve stem 16 which is reciprocable vertically in guide 17. Valve 15 is normally yieldably urged to its seat by the usual helical spring 18 abutting the engine casting at its upper end and abutting the usual valve stem collar 19 at its lower end, the collar 19 being held on the stem by the usual cotter pin 20, and the stem projecting downward below the collar for engagement of the contact head of the actuating tappet with the lower end of the stem to lift the valve periodically from its seat. This tappet is reciprocated by the usual cam 21 fixed on the usual rotary cam shaft 22 of the engine.

All of the parts above referred to are of ordinary construction except the tappet device interposed between the cam and valve stem. This tappet device is vertically extensible and contractible for purposes of adjustment to insure proper functioning of the valve mechanism and to compensate for wear of the parts in use. The tappet device comprises a unitary upper or valve stem impacting member and a duplex lower or cam actuated member, the two sections of the duplex member being relatively adjustable to permit easy screw adjustment of the unitary and duplex members relatively to each other and to lock the members securely against accidental screw adjustment under the influence of vibrations and shocks incident to operation of the engine.

The unitary member in the construction shown in Figs. 1, 2, 5 and 6 comprises a bolt-like male member 23 having a male screw thread 24 and provided with a hexagonal head 25 at its upper end, the head preferably having a short solid vertical and centrally located cylindrical extension or valve stem impacting portion 26 in register with the valve stem. The duplex member in the construction shown in Figs. 1, 2, 5 and 6 comprises a lower main section 27 and an upper relatively rotatable section 28 having identical female screw threads 29 and 30 engaged with the thread 24 of the unitary member for directly screw coupling the unitary and duplex members, the sections 27 and 28 being directly screw coupled by screw threads 31 and 32, the female thread 31 being formed on section 27 and the male thread 32 being formed on section 28.

The section 27 of the duplex member has a closed or sold lower end and its bottom surface is preferably convex in a direction transversely of the cam shaft as shown at 33. Said section 27 has a cylindrical cross-sectional external profile except that it is cut away along one side from its lower end to a point adjacent its upper end to provide a vertically extending flat surface 34, and said flatted portion of the section 27 is slidably guided in a tubular bearing 12 on the engine casting 10 having an internal profile corresponding with the external profile of said flatted portion, whereby the section 27 is slidably and non-rotatably mounted in the engine casting. The upper end of the flat surface 34 preferably terminates below the portion of section 27 having the internal thread 31, as shown.

The screw threads 24, 29 and 30 are of the same pitch and have a constant or uniform pitch, threads 29 and 30 being complementary female threads for male thread 24 with which they are engaged. Screw threads 31 and 32 are complementary threads of equal and uniform pitch, but the pitch of these threads is substantially greater than that of threads 24, 29 and 30. The threads shown are of the self-locking type disclosed in the patent to Dardelet, No. 1,657,244, and their employment as arranged in the construction shown is preferred, although the advantages of the invention may be attained to a large extent by substituting other known standard forms of threads, such as the "V", "U. S. standard", or "Acme" threads.

Section 28 is rotatable relatively to section 27 of the duplex member to place threads 29 and 30 in the relative positions shown in Fig. 6 or the relative positions shown in Fig. 5. In the Fig. 6 adjusted condition of the duplex member said member is axially extended until threads 29 and 30 lie in the same helical path with the threads forming in effect parts of a single thread an intermediate section of which has been removed. In this condition the unitary member 23 of the tappet may be assembled with the duplex member and may be freely screwed up or down in the duplex member for purposes of adjustment. In the Fig. 5 condition of the duplex member the several parts of the tappet device are thread locked in an adjusted relation which will be maintained under operating conditions.

To adjust and lock the members of the tappet device with the duplex member conditioned as in Fig. 6 with all the inclined locking surfaces of the threads in free-screwing relation (i. e. out of forcibly interjammed engagement), it is simply necessary to hold section 28 of the duplex member against rotation and screw up member 23 until impact portion 26 thereof lightly abuts the bottom end of the valve stem with the surface 33 of the duplex member seated on the lowest point of cam 21 and valve 15 resting on its seat 14. Member 23 is then held against rotation and section 28 is screwed down into section 27 as far as possible, this screwing movement with the pitch differential shown being one-half of a complete turn. The parts of the tappet will then have the position shown in Figs. 2 and 5 and a slight clearance will exist between impact portion 26 of the tappet and the bottom end of the valve stem due to a slight contraction of the tappet by the locking adjustment of the duplex member, this contraction being equal to the extent of axial displacement between threads 24 and 29.

This clearance insures full and prompt seating of the valve periodically during operation of the engine and is sufficiently slight to prevent unnecessary noise in operation. If the clearance should be greater or less than desired after an initial adjustment, further adjustment may be made by holding section 28 against rotation and screwing member 23 up or down as far as desired, the threads remaining in their tight-holding or self-locked relation wherein they prevent accidental relative turning between the threaded parts.

The coactive locating surfaces of the several pairs of threads have a slope relatively to the axial line of the threads and make an angle with said axial line which is within the angle of friction of the metal of which the parts of the tappet are formed, said coactive surfaces being displaceable crosswise of each other from free screwing relation into self-locking relation within the limits of displacement allowed by the abrupt abutment surfaces or side faces of the thread ribs, the coactive locking surfaces being forced one across the other while in contact during the locking displacement so that when said displacement is arrested they are engaged under an elastic radial stress within the elastic limit of the part having the female thread.

In the particular profile shown each thread has two locking surfaces sloping in the same direction, one extending across the bottom of the thread groove and the other across the top of the thread rib. The locking surfaces of threads 24, 29 and 30 all slope in one direction, and the locking surfaces of threads 31 and 32 all slope in the opposite direction, so that when section 28 is given a half turn in a direction screwing it down into section 27 from the Fig. 6 position to the Fig. 5 position, the locking surfaces of threads 24 and 29 are in tight bound engagement and the locking surfaces of threads 31 and 32 are in tight bound engagement, while the locking surfaces of threads 24 and 30 are out of tight bound engagement. While the self-holding Dardelet effect is not attained between section 28 and member 23, it is attained between sections 27 and 28 and between section 28 and member 23 so that accidental screwing of section 28 is prevented.

Furthermore it will be noted that the ribs of threads 29 and 30 are tightly drawn respectively against the lower and upper sides of the rib of thread 24 by the differential screw effect in screwing sections 28 as far as possible, so that not only is direct axial lost motion or relative movement between the parts of the tappet under vibration and shocks in operation prevented, but a very tight frictional hold or locking of the several pairs of threads together is obtained by the tight frictional contact of the abutment faces of the pairs of threads. It will also be seen that axial shocks and thrusts on either the upper or lower end of the tappet are transmitted directly between the lowermost and uppermost parts of the tappet through the engaged abutment surfaces of threads 24 and 29, which is a highly desirable feature. The tight side clamping attainable by the differential screw action would hold the parts against accidental derangement with a very considerable degree of security if the parts were threaded with threads which do not have the self-holding low angle locking surfaces, but the displaceable self-holding threads have the additional advantages before pointed out.

It is preferred to adjust the tappet in the manner above described for reasons apparent from the foregoing description, but it may be adjusted by giving section 28 a part turn from Fig. 6 position in the opposite direction as far as possible. In this case the parts would be locked together with the ribs of threads 29 and 30 engaged respectively with the upper and lower sides of the rib of thread 24.

In the construction shown in Figs. 3 and 4 the invention is illustrated in connection with a valve mechanism wherein a pivoted tappet device is interposed between the cam and valve stem. The inlet valve 35 is fixed on stem 36 and normally urged to its seat 37 by a spring 38 interposed between a part of the engine casing 39 and the collar 40 held on the valve stem by cotter pin 41. The valve stem is reciprocable in guide bearing 42 by the swinging tappet to lift the valve periodically from its seat.

The tappet comprises a unitary valve stem engaging member 43 screw coupled with both sections of a duplex member comprising a main cam-operated section 44 pivotally journalled at one end on a stationary shaft 45 and a relatively adjustable section 46 screwed into the opposite end of said main section. A pair of cotter pins 47 hold section 44 against movement longitudinally of pivot shaft 45. Section 44 has a roller 48 which is journalled in a yoke 49 depending from section 44 intermediate the ends of said section, said roller resting on cam 50 fixed on the cam shaft 51 of the engine.

The coupling threads all extend around a common axis substantially in axial alignment with the valve stem and are of the same form and arrangement and pitches as the corresponding threads of the parts of the reciprocable tappet shown in Figs. 1, 2, 5 and 6. The sections 44 and 46 of the duplex member are directly coupled by the high pitch threads 52 and 53, while the unitary bolt-like member 43 has its shank formed with a male thread 54 engaged with complementary female threads 55 and 56 of sections 44 and 46 of the duplex member, threads 54, 55 and 56 being the lower pitch threads.

Member 43 has a hexagonal head 57 the top of which is dome-shaped as shown at 58 for engagement with the bottom end of the valve stem when the tappet is swung upward to unseat the valve. The upper end portion of section 46 has a hexagonal profile. The mode of adjustment is of course the same as in the case of the reciprocable tappet. The pivotal mounting of section 44 holds it against turning about the axial line of the screw threads during screwing of section 46 and member 43.

What I claim is:

1. A poppet valve mechanism comprising a driven element, an actuating cam therefor, and an extensible and contractible tappet interposed directly between the cam and driven element and comprising an extensible and contractible duplex member having a main section and a locking section directly screw thread coupled and a unitary member directly screw thread coupled with both sections of the duplex member by threads of a different pitch from that of the threads coupling the sections of the duplex member, the axes of the threads being disposed for adjustment of one of the tappet members toward and from the driven element.

2. A poppet valve mechanism as claimed in claim 1, wherein the threads of the smaller pitch couple the unitary member with the two sections of the duplex member and have coactive forcibly telescopible helicoidal locking surfaces making a small angle with the axial line of the thread and sloping in such a direction longitudinally of the axial line as to effect locking of the unitary member to the main section upon a contracting adjustment of the duplex member, and the threads of the greater pitch couple the two sections of the duplex member and have coactive forcibly telescopible helicoidal locking surfaces all sloping in the opposite direction at a small angle to the axial line for locking the two sections of the duplex member together upon a contracting adjustment of the locking section.

3. An adjustable tappet mechanism comprising a sectional tappet having a fixed throw and comprising an impact imparting member, a main body member directly coupled with the impact imparting member by screw threads for extending and contracting the tappet and a locking member having a thread of the same pitch as the first mentioned threads engaged with the impact member thread, said locking member being directly coupled with the main body member by screw threads of greater pitch than the first mentioned threads for releasing the main and impact imparting members for primary adjustments when the locking member is rotated in one direction and effecting a secondary contracting adjustment of said member and a frictional locking thereof against accidental screwing when the locking member is rotated in the opposite direction.

4. An adjustable tappet mechanism as claimed in claim 3, wherein the threads coupling the main and impact imparting members have coactive helicoidal crest and root locking surfaces of different widths sloping in the same direction toward the axial line of the threads and making an angle with said line within the angle of friction of the surfaces, and are relatively displaceable by the locking and contracting adjustment of the locking member relatively to the main member and impact imparting member to jam said locking surfaces together and force the ribs of the two threads engaged with the impact member thread against opposite sides of the rib of the latter thread.

5. A poppet valve mechanism comprising a sectional tappet extensible and contractible in the general direction of its throw, said tappet having two sections directly screw thread coupled for primary extending and contracting adjustments of the tappet and means for displacing said sections axially of their coupling threads to take up back lash in the threads and slightly contract the tappet from the adjusted condition obtained by a primary screwing adjustment of the sections.

6. A sectional tappet comprising two members having coupling screw threads connecting the same for primary adjustments, and means for displacing said sections axially of their coupling threads to take up back lash in the threads, slightly contract the tappet and frictionally lock the two members against accidental relative screwing movements.

7. An adjustable tappet comprising a main body member and an impact imparting member having coupling threads of equal and constant pitch connecting the same for primary screwing adjustments, and a third member having a thread of the same pitch as said first mentioned threads engaged with the impact member thread, said third member and main body member having coupling threads of equal and constant pitch and of greater pitch than the first mentioned coupling threads for effecting a secondary adjustment and a frictional lock between the main and impact members when the third member is rotated relatively thereto in one direction and effecting a release of the frictional lock when the third member is rotated in the opposite direction.

8. An adjustable tappet as claimed in claim 7, wherein the threads coupling the main and impact members are relatively displaceable crosswise and have coactive helicoidal crest and root locking surfaces of different widths making crosswise of the threads an angle with the thread axes which is within the angle of friction of the material of which the members are formed, the direction of slope of said surfaces axially of the threads being such as to afford forcible interjamming thereof upon a tappet contracting secondary adjustment of the third member.

9. An ajustable tappet comprising a main body member and an impact member, said members having coupling screw threads of equal pitch connecting the same for primary adjustments of the impact member in the general direction of the throw of the tappet, said threads having coactive crest and root locking surfaces making a small angle with their axial line and forcible one across the other into self-locking relation, the locking surfaces sloping in such a direction longitudinally of the thread axes as to move into locked relation when the threads are telescoped in tappet contracting direction, and a locking and releasing member having a thread of the same pitch as said coupling threads engaged with the impact member thread, said locking and releasing member and the main body member having coupling threads of greater pitch connecting the same for rotary adjustment of the locking member to release the locking surfaces of the main and impact member coupling threads when the locking member is rotated in one direction and to displace said locking surfaces of the main and impact member threads into tightly jammed relation and force the ribs of the main and locking member threads which couple said members with the impact member against opposite sides of the rib of the impact member thread.

In testimony whereof I hereunto affix my signature.

WILLIAM E. HOKE.